United States Patent
Jiang

(10) Patent No.: US 7,075,580 B2
(45) Date of Patent: Jul. 11, 2006

(54) EDGE ADAPTIVE SPATIAL TEMPORAL DEINTERLACING

(75) Inventor: Hong Jiang, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 583 days.

(21) Appl. No.: 10/326,344

(22) Filed: Dec. 19, 2002

(65) Prior Publication Data

US 2004/0119884 A1   Jun. 24, 2004

(51) Int. Cl.
*H04N 11/20* (2006.01)
*H04N 7/01* (2006.01)

(52) U.S. Cl. ........................ 348/448; 348/449
(58) Field of Classification Search ............... 348/448, 348/449, 452, 458; 382/199, 266
See application file for complete search history.

(56) References Cited

U.S. PATENT DOCUMENTS 6,614,484 B1 *  9/2003  Lim et al. .................. 348/448
6,731,342 B1 *  5/2004  Shin et al. .................. 348/452

* cited by examiner

*Primary Examiner*—Michael H. Lee
(74) *Attorney, Agent, or Firm*—Sharon Wong

(57) ABSTRACT

Embodiments of the present invention provide an edge adaptive spatial temporal deinterlacing filter that evaluates multiple edge angles and groups them into left-edge and right-edge groups for reconstructing desired pixel values. A leading edge is selected from each group, forming the final three edges (left, right and vertical) to be determined. Spatial temporal filtering is applied along the edge directions.

59 Claims, 6 Drawing Sheets

|      | ODD | EVEN | ODD | EVEN |      |
|------|-----|------|-----|------|------|
|      | T00 | T01  | T02 | T03  | ODD  |
|      | T10 | T11  | T12 | T13  | EVEN |
|      | T20 | T21  | T22 | T23  | ODD  |
|      | T30 | T31  | T32 | T33  | EVEN |

|      | ODD | EVEN | ODD | EVEN |      |
|------|-----|------|-----|------|------|
|      |     |      |     |      | ODD  |
|      |     | pix0 | pix1|      | EVEN |
|      |     | pix2 | pix3|      | ODD  |
|      |     |      |     |      | EVEN |

EDGE ADAPTIVE SPATIAL TEMPORAL DEINTERLACING

BACKGROUND

Displaying video content that was originally created for television on a computer display would be a useful feature of a multi-media computer system. However, television video signals and the video formats of most computer displays are not the same. Computers commonly use a non-interlaced video display format, also called a progressive scan. That is, an entire frame is scanned line-by-line, typically from top to bottom. The process repeats and re-scans the entire frame at a given refresh rate. In contrast, many sources of consumer video, such as television signals, use an interlaced display format.

Interlaced systems interleave two or more fields to display an entire frame. A typical U.S. NTSC television signal uses two fields, each with video data for every other horizontal line of the entire frame, and consecutively scans the two fields 30 times per second. The viewer perceives the resulting image as a blend of the two individual fields with an effective refresh rate of 60 Hz. If instead, the entire frame was scanned progressively at 30 Hz, the viewer might perceive a flicker of the displayed image. The flicker is much less apparent with higher refresh rates such as 60 Hz. The interlaced format thus reduces flicker without requiring a doubling of the data transfer rate needed to update the entire frame at 60 Hz. Other interlaced video formats are also common, such as the 50 Hz phase alternation line (PAL) system used in Europe. All such interlaced formats use the technique of interleaving fields to create an entire frame, and the present invention is not intended to be limited to deinterlacing any particular interlaced video format.

Modern computer systems are not constrained by data transfer rates required for the noninterlaced format to the same extent as were early television systems. However, the use of interlaced display formats for many consumer video products is still common. In order to display this interlaced material on a non-interlaced computer display there is a need for deinterlacing.

A conventional deinterlacing method applies a vertical filter to scale up a field to construct a frame for display. This method is called a line doubler in pro-scan television set or bob method in the PC graphics industry as different vertical offsets of the odd and even fields are adjusted as part of the up scaling. Due to the loss of vertical resolution within one interlaced field, flickering artifacts can be observed. This is more pronounced in relatively static areas that contain high vertical frequency details.

BRIEF DESCRIPTION OF THE DRAWINGS

FIG. 6(a) is a diagram of an embodiment of an input region to the edge adaptive spatial temporal deinterlacing filter.

FIG. 6(b) is a diagram of an embodiment of an output region from the edge adaptive spatial temporal deinterlacing filter.

DETAILED DESCRIPTION

Figure 1:
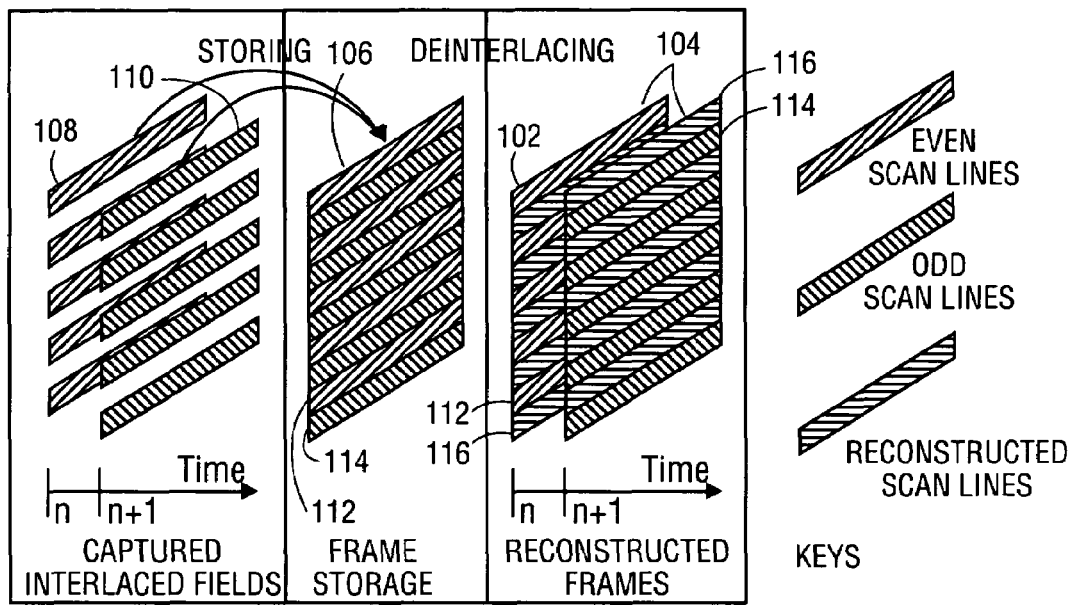
FIG. 1 is a diagram of an embodiment of a two-field edge adaptive spatial temporal deinterlacing operation flow.

Embodiments of the present invention provide an edge adaptive spatial temporal deinterlacing filter that evaluates multiple edge angles and groups them into left-edge and right-edge groups for reconstructing desired pixel values. A leading edge is selected from each group, forming the final three edges (left, right and vertical) to be determined. Spatial temporal filtering is applied along the edge directions.

In the detailed description, numerous specific details are set forth in order to provide a thorough understanding of the present invention. One skilled in the relevant art will recognize, however, that the invention can be practiced without one or more of the specific details, or with other methods, components, etc. In other instances, well-known structures or requests are not shown or described in detail to avoid obscuring aspects of various embodiments of the invention.

Some portions of the detailed description that follow are presented in terms of algorithms and symbolic representations of operations on data bits or binary signals within a computer. These algorithmic descriptions and representations are the means used by those skilled in the data processing arts to convey the substance of their work to others skilled in the art. An algorithm is here, and generally, considered to be a self-consistent sequence of steps leading to a desired result. The steps include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities. Unless specifically stated otherwise as apparent from the following discussions, it is appreciated that throughout the specification, discussions utilizing such terms as processing or computing or calculating or determining or the like, refer to the action and processes of a computer or computing system, or similar electronic computing device, that manipulate and transform data represented as physical (electronic) quantities within the computing system s registers and/or memories into other data similarly represented as physical quantities within the computing system s memories, registers or other such information storage, transmission or display devices.

Embodiments of the present invention may be implemented in hardware or software, or a combination of both. However, embodiments of the invention may be implemented as computer programs executing on programmable systems comprising at least one processor, a data storage system (including volatile and non-volatile memory and/or storage elements), at least one input device, and at least one output device. Program code may be applied to input data to perform the functions described herein and generate output information. The output information may be applied to one or more output devices, in known fashion. For purposes of this application, a processing system includes any system that has a processor, such as, for example, a digital signal processor (DSP), a microcontroller, an application specific integrated circuit (ASIC), or a microprocessor.

The programs may be implemented in a high level procedural or object oriented programming language to communicate with a processing system. The programs may also be implemented in assembly or machine language, if desired. In fact, the invention is not limited in scope to any particular programming language. In any case, the language may be a compiled or interpreted language.

The programs may be stored on a storage media or device (e.g., hard disk drive, floppy disk drive, read only memory (ROM), CD-ROM device, flash memory device, digital versatile disk (DVD), or other storage device) readable by a general or special purpose programmable processing system, for configuring and operating the processing system when the storage media or device is read by the processing system to perform the procedures described herein. Embodiments of the invention may also be considered to be implemented as a machine-readable storage medium, configured for use with a processing system, where the storage medium so configured causes the processing system to operate in a specific and predefined manner to perform the functions described herein.

The present invention provides an edge-adaptive spatial-temporal filter that applies non-linear spatial-temporal filtering along a certain direction. An edge detection algorithm, including a pixel-pairing scheme, operates on a finite number of reference pixels. Adjacent interlaced input fields are stored in memory and one or two deinterlaced frames are created.

FIG. 1 illustrates a diagram of an embodiment 100 of a two-field edge adaptive spatial temporal deinterlacing operation flow. Two deinterlaced frames 102 and 104 are constructed from a single frame 106 in memory where two interlaced input fields 108 and 110 are stored. In particular, interlaced input fields 108 and 110 are captured at times t.sub.n and t.sub.n+1, respectively. The adjacent interlaced input fields 108 and 110 are stored (interleaved) as a single frame 106 in memory. The corresponding deinterlaced frames 102 and 104 correspond to time t.sub.n and t.sub.n+1, respectively.

An interlaced video frame contains two fields. The first field consists of the odd lines 114 in the interlaced video frame 106 and the second field consists of the even lines 112 in the interlaced video frame 106. When displayed on an interlaced video system, the lines of the two fields 112 and 114 are displayed in an alternating fashion. All odd lines 112 of the interlaced video frame 106 are displayed, and a time period later, such as one-sixtieth of a second later, all even lines 112 of the interlaced video frame 106 are displayed.

Reconstructed frame 102 at time t.sub.n includes even scan lines 112 and scan lines 116 reconstructed in accordance with embodiments of the present invention. Similarly, reconstructed frame 104 at time t.sub.n+1 includes odd scan lines 114 and scan lines 116 reconstructed in accordance with embodiments of the present invention.

Figure 2:
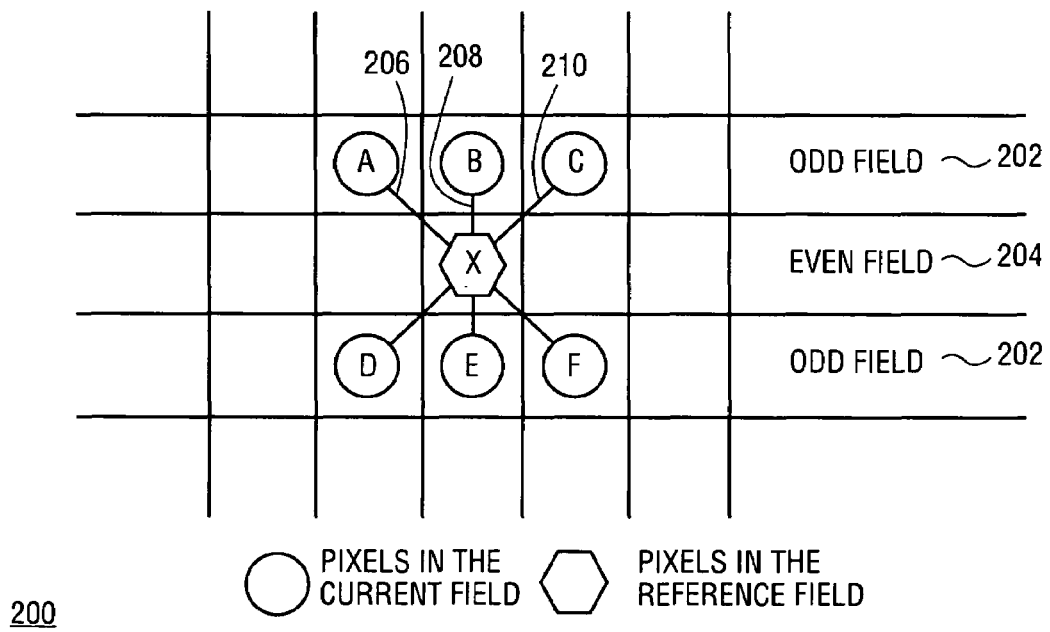
FIG. 2 is a diagram of an embodiment of a layout of a pixel (X) reconstructed with three edge angles using the edge adaptive spatial temporal deinterlacing filter.

FIG. 2 is a diagram of an embodiment of a layout of a pixel (X) reconstructed with three edge angles 206, 208, 210 using the edge adaptive spatial temporal deinterlacing filter. The target value X is temporal in time and the neighboring pixels, such as A, B, C, D, E and F are the spatial values. The current field is the odd field 202 and the reference field is the even field 204. The two-field deinterlacer takes in two input fields (odd and even) 202 and 204 that are stored (interleaved) together as a frame memory. The pixels in the even input field 204 (lines), which is sampled at a different time, are used as references to reconstruct the missing pixels in the even lines.

For example, pixel location X is to be constructed. The six neighboring pixels, labeled A, B, C, D, E, and F, in the current (odd) field 202 are used to construct the pixel location X in the reference (even) field 204. The reconstructed value for location X is given by the spatial-temporal filtered value of three pixels (always including value X) along a selected edge direction. The edge directions 206, 208 and 210 are shown in FIG. 2 where the direction connecting A-X-F, B-X-E and C-X-D is −45 degree (see 206), 90 degree (see 208) and 45 degree (see 210), respectively.

In particular, edge detection is achieved by comparing the absolute difference of the two pixels in the neighbor lines in the current field 202 around the target location. For example, the absolute value of the following pixels are determined: abs(A–F), abs(B–E) and abs(C–D). An edge is formed along the direction that has the smallest absolute difference value.

As explained in detail below, various techniques are used to improve the robustness of the edge direction. For example, in one embodiment, a detected edge is considered significant when the absolute difference along one edge direction is less than that of the other edge directions by a predefined threshold. In another embodiment, the absolute difference itself is considered significant when it is smaller than another predefined threshold. The threshold values may be programmable and provided in a register.

Figure 3:
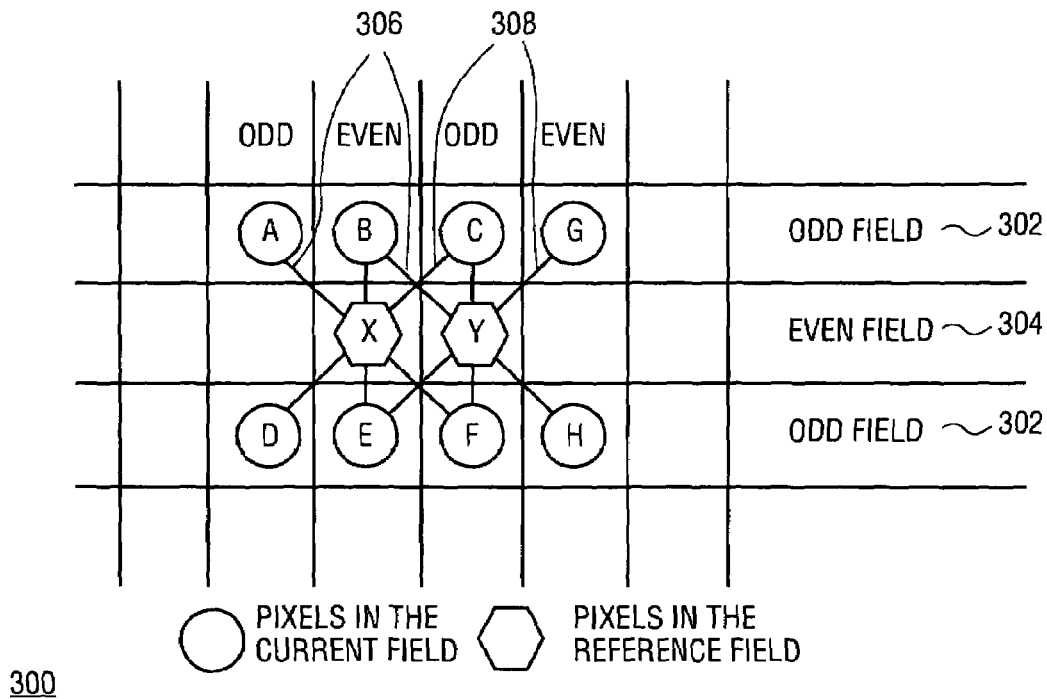
FIG. 3 is a diagram of an embodiment of a layout of a pixel pair (X, Y) reconstructed with three edge angles using the edge adaptive spatial temporal deinterlacing filter.

FIG. 3 is a diagram of an embodiment of a layout of a pixel pair (X, Y) reconstructed with three edge angles using the edge adaptive spatial temporal deinterlacing filter. For example, the pixel layout can be for the reconstructed frame 104 at time t.sub.n+1 including odd scan lines 114 shown in FIG. 1. It is desired to determine the reconstructed scan lines 116. Referring to FIG. 3, pixel locations X and Y are to be constructed. The eight neighboring pixels, labeled A, B, C, D, E, F, G and H in the current(odd) field 302 are used to construct the pixel locations X and Y in the reference (even) field 304. The pixels in the current field are used to construct the fields in the reference field. For illustrative purposes, the current field is denoted as the odd field 302. One skilled in the art will recognize that the current field can be an odd or even field however depending upon the application. For example, to reconstruct scan lines for frame 102 in FIG. 1, the current field would be even scan lines.

The invention groups edge angles into left-edge groups 306 and right-edge groups 308. One leading candidate is found from each group 306 and 308, forming the final three edges (left, right and vertical) to be determined. Different criteria are used for selecting leading left/right edges from edge groups from the one used in determining the present of an edge from the final three.

As noted above, further robustness improvement is achieved by applying the edge detection for a target construction pixel pairs. As shown in FIG. 3, X and Y form the pixel pair. The above-mentioned absolute difference calculation for reconstruction of pixel X (i.e. abs(A–F)) shown in FIG. 2 is replaced by the sum of absolute difference in an edge direction. For example, abs(A–F) is replaced by (abs (A–F)+abs(B–H)) for the left edge direction. When an edge direction is determined, spatial temporal (ST) filtering along that direction applies to both X and Y positions.

The reconstructed pixels in positions X and Y are given by $$X_{new} = \begin{cases} st(A, F, X) & \text{for } -45° \text{ edge} \\ st(C, D, X) & \text{for } 45° \text{ edge} \\ st(B, E, X) & \text{no edge found} \end{cases}$$

and $$Y_{new} = \begin{cases} st(B, H, Y) & \text{for } -45° \text{ edge} \\ st(G, E, Y) & \text{for } 45° \text{ edge} \\ st(C, F, Y) & \text{no edge found} \end{cases}$$

where the spatial temporal filter, st(a, b, x), is defined as $$st(a, b, x) = \begin{cases} x & \text{if } (a \leq x \leq b) || (b \leq x \leq a) \\ (a+b)//2 & \text{otherwise} \end{cases}$$

and // is the rounding away from zero operation that $(a+b)//2=(a+b+1)>>1$

The detected edge direction is governed by the following equations $$\text{Edge} = \begin{cases} -45° & \text{if } DA_{enable} \ \&(E_{-45} < T_l) \ \&(E_{-45} + T_h < E_{45}) \ \& \\ & (E_{-45} + T_h < E_{90}) \\ 45° & \text{elseif } DA_{enable} \ \&(E_{45} < T_l) \ \&(E_{45} + T_h < E_{-45}) \ \& \\ & (E_{45} + T_h < E_{90}) \\ 90° & \text{otherwise} \end{cases}$$

where $T_l$ and $T_h$ are the low and high thresholds, and the edge values are $E_{-45}=|A-F|+|B-H|$, $E_{90}=|B-E|+|C-F|$, $E_{45}=|C-D|+|G-E|$.

Note from the above equations for the Edge, there is no equal sign in the conditions for −45° and 45° directions. It means that vertical direction is the fallback for all other conditions including any tie condition.

In a typical implementation, edge values range from 0 to 510 (9-bit unsigned), when 8-bit unsigned values ranging from 0 to 255 are used to represent the pixels. The thresholds $T_L$ and $T_H$ are 8-bit unsigned values.

A programmable $DA_{enable}$ field enables the above direction adaptation. When $DA_{enable}$ is unset, only the spatial-temporal filter along vertical direction (90 degree) is used.

The above-described edge adaptive spatial temporal (EAST) deinterlacer works independently on each color component (channels Y, U, V) for all supported FOURCC formats including but not limited to YUY2, YUYV, YVYU, UYVY, VYUY.

Figure 4:
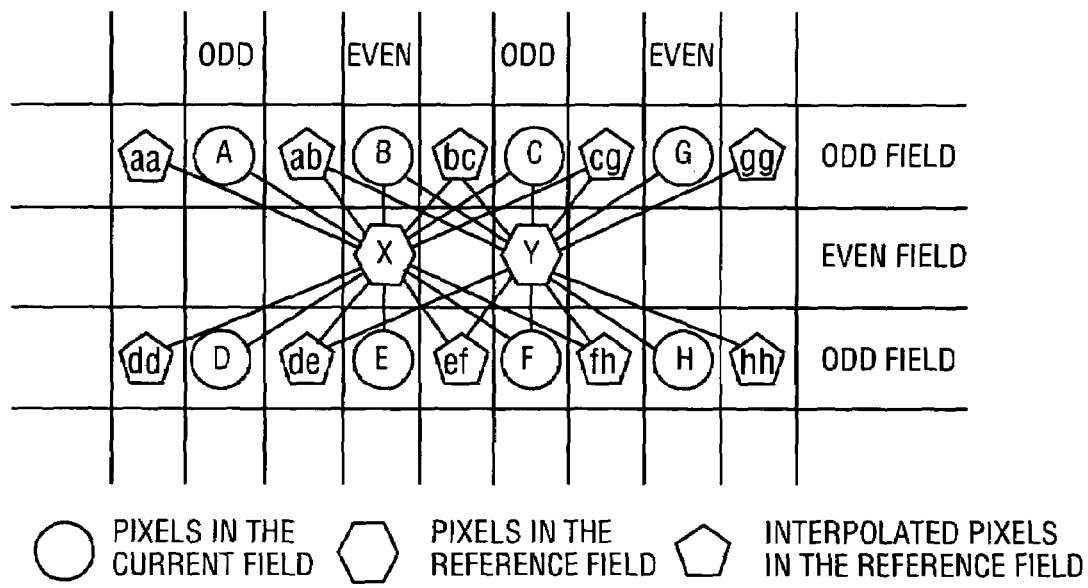
FIG. 4 is a diagram of an embodiment of a layout of a pixel pair (X, Y) reconstructed with seven edge angles using the edge adaptive spatial temporal deinterlacing filter.

One skilled in the art will recognize the number of edge directions evaluated is not limited to a certain number. FIG. 4 is a diagram of an embodiment of a layout of a pixel pair (X, Y) reconstructed with seven edge angles using the edge adaptive spatial temporal deinterlacing filter. Neighboring pixels in the current field along the lines above/below the current position, as well as interpolated and extrapolated pixels, are evaluated.

As shown in FIG. 4, seven edge directions are evaluated for a pixel pair X and Y with 4×3 neighboring pixels (filter span) used. Additional edge directions with subpixel precisions may be generated by interpolating or extrapolating between neighboring pixels. Interpolation such as linear interpolation is used to create subpixel edge precision. As shown, value ab between pixels A and B can be calculated as ab=(A+B)/2. Due to the 4×3 limited filter span, subpixel precision value such as aa is estimated by spatial extrapolation from the filter span (aa=A).

Figure 5A:
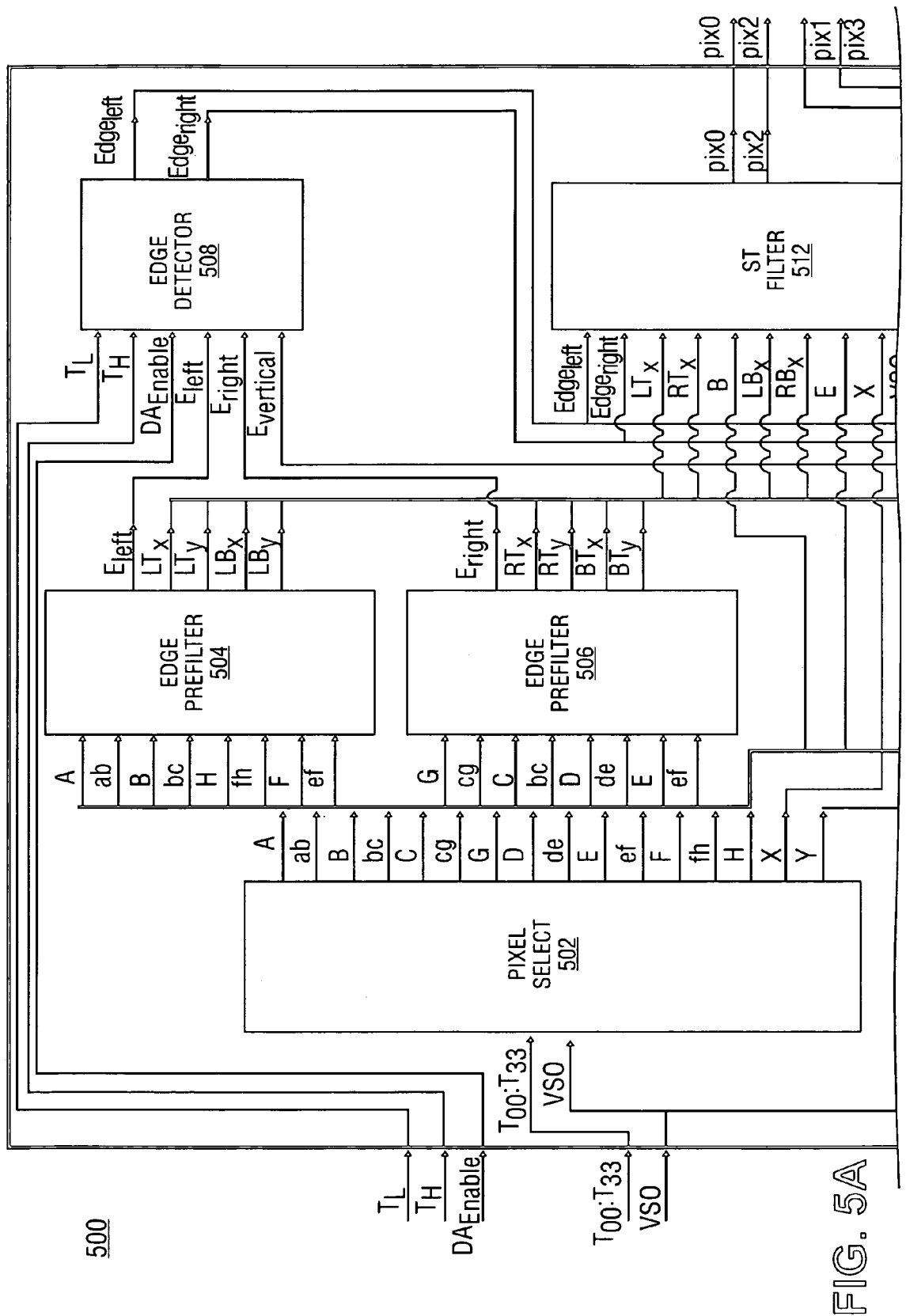
FIGS. 5A and 5B are a diagram of an embodiment of a deinterlacing system to reconstruct desired scan lines.
Figure 5B:
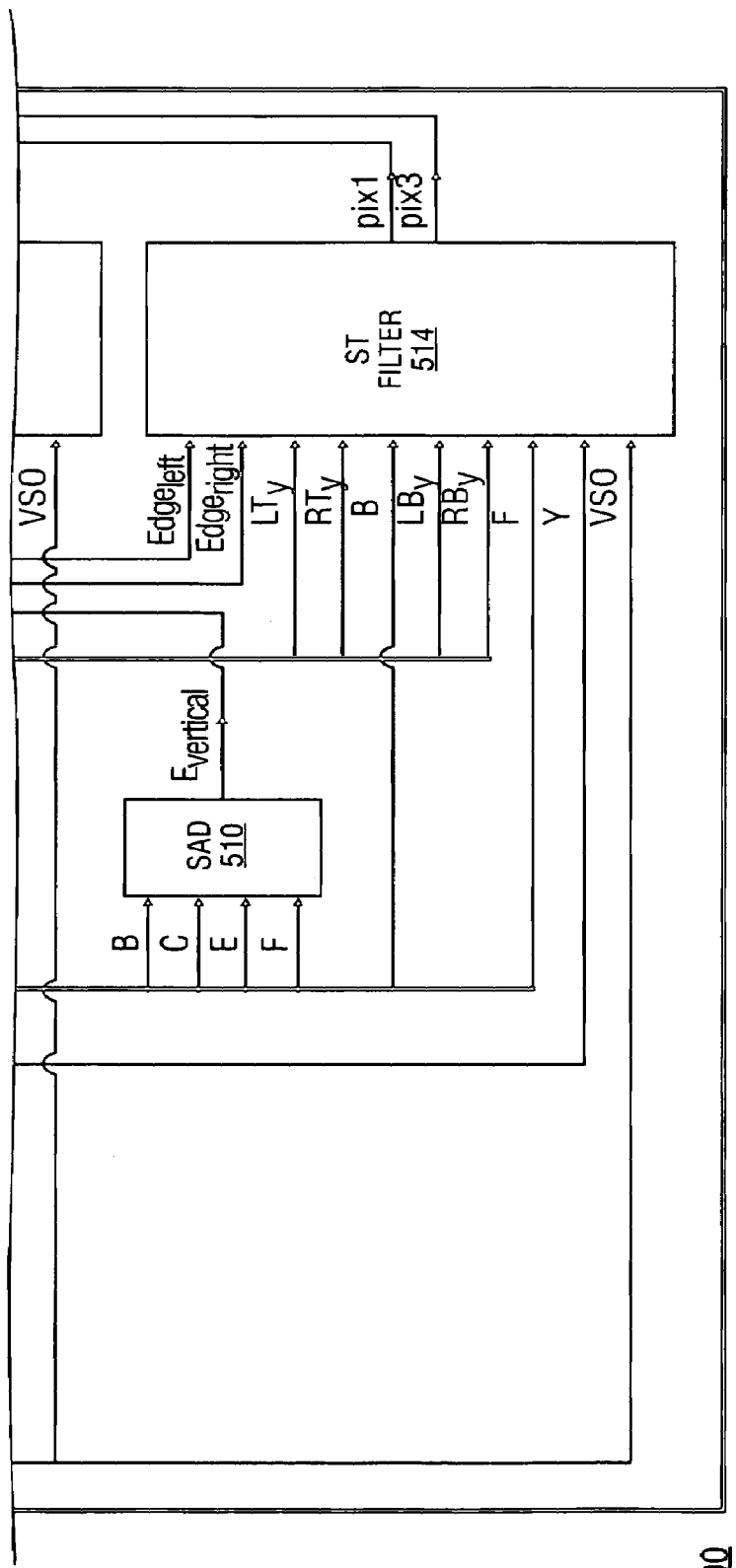

FIGS. 5A and 5B are a diagram of an embodiment 500 of a deinterlacing system to reconstruct desired scan lines. The deinterlacing system includes pixel selector 502, edge pre-filters 504 and 506, sum of absolute difference (SAD) 508, edge detector 510 and spatial temporal (ST) filters 512 and 514. Region data is input to pixel selector 502 of deinterlacing system and the output from ST filters 512 and 514 is deinterlaced video output signal.

In particular, region map is a diagram of a detailed layout of one embodiment or region data. Region data of a video signal is a set of pixels in a video frame. A frame can be made up of multiple regions, and region data, which is one region of a video frame, is not limited to any particular shape. For example, the outline of a set of pixels that form region data can be a polygon, a circle, or an ellipse. In one embodiment, region map represents a sixteen-by-sixteen block of pixels containing sixteen rows of interleaved field data for an interlaced video signal. In an alternate embodiment, region data is any set of pixels in a frame.

FIG. 6(a) is a diagram of an alternate embodiment 600 of an input region to the edge adaptive spatial temporal deinterlacing filter. The region data is a set of 4×4 pixels. The 4×4 pixels mark a region in the interlaced frame with the first pixel T00 being an odd pixel on an odd line and the last pixel T33 being an even pixel on an even line. This region select is independent of the current field being the even field or the odd field. Selecting a 4×3 filter region from this 4×4 region is done by the pixel selector 502 (FIG. 5) using signal VSO. VSO represents the vertical shift offset and indicates the current field is an even or odd field. When VSO is unset, the current field is an even field. When VSO is set, the current field is an odd field. Pixel region T00 to T33 and VSO apply to pixel selector 502. Pixel selector 502 receives and selects neighboring pixels in the current field of the region data along the lines above and below the target position for the desired X and Y pixel pairs. When VSO is unset, pixel T00, T01, to T23 form the 4×3 filter region with pixels T11 and T12 mapped to the desired X and Y pixel pairs, T00, T01, T02, T03 mapped to the top neighbors A, B, C, G, and T20, T21, T22, T23 mapped to the bottom neighbors D, E, F, H. When VSO is set, pixel T10, T11, to T33 form the 4×3 filter region with pixels T21 and T22 mapped to the desired X and Y pixel pairs, T10, T11, T12, T13 mapped to the top neighbors A, B, C, G, and T30, T31, T32, T33 mapped to the bottom neighbors D, E, F, H. Pixel selector 502 outputs the mapped A, B, C, D, E, F, G, H pixels as well as the interpolated pixel values ab, bc, cg, de, ef, and fh at subpixel positions. FIG. 6(b) is a diagram of an embodiment 602 of the output region from the edge adaptive spatial temporal deinterlacing filter.

Referring to FIGS. 5A and 5B, left and right edge angle outputs from pixel selector 502 are applied to left and right edge pre-filters 504 and 506, which select the optimal left and right edge angles, respectively based upon the first field pixel inputs. The angles are thus sorted into left and right edges groups and applied to the respective edge pre-filter. Edge pre-filter 504 selects the optimal left edge angle from among the three left edge angles formed by the pixels in the first region. Edge pre-filter 506 selects the optimal right edge angle from among the three right edge angles formed by the pixels in the first region. The right and left edges intersect the targeted pixel locations X and Y in the second field.

The optimal angle is determined based upon the absolute edge calculations. The outputs of left edge pre-filter 504 include Eleft, Ltx, Lty, Lbx and Lby. Eleft represents the value of the left edge angle that has the smallest absolute difference calculation. Ltx, Lty, Lbx and Lby represent the pixel values for that edge. In particular, Ltx and Lty represent the top pixel value of the optimal left edge for X and Y respectively. Lbx and Lby represent the bottom pixel value of the optimal left edge for X and Y, respectively.

The outputs of right edge pre-filter 506 include Eright, Rtx, Rty, Rbx and Rby. Eright represents the value of the right edge angle that has the smallest absolute difference calculation. Rtx, Rty, Rbx and Rby represent the pixel values for that edge. In particular, Rtx and Rty represent the top pixel value of the optimal right edge for X and Y, respectively. Rbx and Rby represent the bottom pixel value of the optimal right edge for X and Y, respectively.

Left edge, right edge and vertical edge angle values are applied to edge detector 508 along with low and high threshold values (Tl and Th) and enable signal (DAenable). In particular, Eleft and Eright values from left and right pre-filters 504 and 506 are applied to edge detector 508.

The vertical edge value (Evertical) represents the sum of the differences of the vertical pixels. For example, in the example shown in FIG. 4, pixels B and E are located vertical to target location X, and pixels C and F are located vertical to target location Y. Vertical pixel values are applied to the SAD 310 and the Evertical output is applied to edge detector 508.

The outputs of edge detector 508 include Boolean signals Edge.sub.left and Edge.sub.right. When both Edge.sub.left and Edge.sub.right are not set, it indicates that only the vertical value is used to reconstruct the targeted values in the second field. When Edge.sub.left is set, the value on the edge value associated with the left edge is used to reconstruct the targeted values in the second field. When Edge.sub.right is set, the value on the edge value associated with the right edge is used to reconstruct the targeted values in the second field. It is invalid to set both Edge.sub.left and Edge.sub.right.

DAenable determines whether edge filtering is activated or not. When DAenable is unset, both Edge.sub.left and Edge.sub.right are unset, only the vertical value is used to reconstruct the targeted values in the second field. When DAenable is set, the left, right and vertical edge values, Eleft, Eright, Evertical, are considered. In particular, all three values are compared to each other and the low and high threshold motion values Tl and Th to determine which value should be used to reconstruct the targeted value in the second field. Any number of thresholds might be used and there is no fundamental limit to the range of possible threshold values, and the present invention is not intended to be limited to any number or range of thresholds.

For reconstructing a target in the second field with three edge angles (Eleft, Eright, Evertical), the edge angle that has an absolute difference that is smaller than that of the other two edge angle directions is used for reconstruction. In one embodiment, the edge angle with the smallest absolute difference value is then compared to the low and high threshold motion values (Tl and Th). If the smallest absolute difference value is greater than Tl and less than the edge values of the other two edges by an amount exceeding Th, the edge value associated with the smallest absolute difference is applied to ST filter to reconstruct the single targeted value in the second field. Preferably, the threshold values are set according to factors such as the noise level in the video signal, the amount of motion expected, and the contrast expected in an image. Thresholds would best be based on, and set individually for, a particular video sequence.

For reconstructing one or more targets in the second field with more than 3 edge angles, the group of edge angles in a direction (left, right or vertical) that has the smallest absolute difference sum is used for reconstruction. In one embodiment, the edge angle with the smallest absolute difference sum value is then compared to the low and high motion threshold values (Tl and Th). If the smallest absolute difference sum value is greater than Tl and less than the edge values of the other two edges by an amount exceeding Th, the edge value associated with the smallest absolute difference sum is applied to ST filter to reconstruct the single targeted value in the single field.

The spatial-temporal filter is a non-linear filter that determines averaging or insertion based on range comparison to mitigate/reduce aliasing noise. Spatial temporal filtering is applied along the edge direction. The edge-adaptive spatial filter deinterlacer provides for implicit motion adaptation that improves spatial resolution for stationary areas while minimizing artifacts in motion areas. Edge adaptation provides smooth edges and smooth lines versus jagged edges and lines. Flexible chroma processing improves color fidelity. Numerous video formats are supporting, including but not limited to YUV420 planar, YUV411 planar, and YUV422 packed. In one embodiment, the deinterlacer provides high throughput with 4 pixels per clock.

ST filter (X) 512 filters the X pixel and ST filter (Y) 514 filters the Y pixel. In particular, Edge.sub.left, Edge.sub.right, LTx, RTx, B, LBx, RBx, E, X and VSO are applied to ST filter (X) 512. Edge.sub.left and Edge.sub.right are the Boolean signal output from edge detector 508, representing the optimal edge angle. LTx and RTx represent the location of the pixel at the top of the selected left and right edges. LBx and RBx represent the location of the pixel at the bottom of the selected left and right edges. B and E represent the vertical neighbor pixels in the current field (top line and bottom line). VSO represents the vertical shift offset and indicates the current field is an even or odd field.

The outputs of ST filter (X) 512 include pix0 and pix2 in the positions as shown in FIG. 6(*b*) that correspond to the input positions at T11 and T21 as shown in FIG. 6(*a*). When VSO is not set, E is the vertical neighbor pixel in the bottom line and takes the value of T21, and thus pix0 is the reconstructed X value and pix2 is a copy of E (and therefore T21). When VSO is set, B is the vertical neighbor pixel in the top line and takes the value of T11, and thus pix2 is the reconstructed X value and pix0 is a copy of B (and therefore T11).

Selecting of the neighbor pixels in the current field depends on the values of Edge.sub.left and Edge.sub.right. In particular, when both Edge.sub.left and Edge.sub.right are not set, vertical neighbor pixels in the current field (top line and bottom line) such as B and E are applied to ST filter (X) 512; when Edge.sub.left is set and Edge.sub.right are not set, left edge pixels in the current field such as LTx and LBx are applied to ST filter (X) 512; when Edge.sub.left is not set and Edge.sub.right is set, right edge pixels in the current field such as RTx and RBx are applied to ST filter (X) 512. The X value from the reference field is also applied to ST filter (X) 512. The X center value in the reference field is compared against the two selected neighbor pixels in the current field. If the center value falls within the range of the other two, the center value is used. If the center falls outside the other two selected neighbor values, the average of the selected neighbor values is used as the final pixel value.

ST filter (Y) 514 filters the Y pixel. In particular, Edge.sub.left, Edge.sub.right, LTy, RTy, C, LBy, RBy, F, Y and VSO are applied to ST filter (Y) 514. Edge.sub.left and Edge.sub.right are the Boolean signal output from edge detector 508, representing the optimal edge angle. LTy and RTy represent the location of the pixel at the top of the selected left and right edges. LBy and RBy represent the location of the pixel at the bottom of the selected left and right edges. C and F represent the vertical neighbor pixels in the current field (top line and bottom line). VSO represents the vertical shift offset and indicates the current field is an even or odd field.

The outputs of ST filter (Y) 514 include pix1 and pix3 in the positions as shown in FIG. 6(*b*) that correspond to the input positions at T12 and T22 as shown in FIG. 6(*a*). When VSO is not set, F is the vertical neighbor pixel in the bottom line and takes the value of T22, and thus pix1 is the reconstructed Y value and pix3 is a copy of F (and therefore T22). When VSO is set, C is the vertical neighbor pixel in the top line and takes the value of T12, and thus pix3 is the reconstructed Y value and pix1 is a copy of C (and therefore T12).

Selecting of the neighbor pixel in the current field depends on the values of Edge.sub.left and Edge.sub.right. In particular, when both Edge.sub.left and Edge.sub.right are not set, vertical neighbor pixels in the current field (top line and bottom line) such as C and F are applied to ST filter (Y) 514; when Edge.sub.left is set and Edge.sub.right are not set, left edge pixels in the current field such as LTy and LBy are applied to ST filter (Y) 514; when Edge.sub.left is not set and Edge.sub.right is set, right edge pixels in the current field such as RTy and RBy are applied to ST filter (Y) 514. The Y value from the reference field is also applied to ST filter (Y) 514. The Y center value in the reference field is compared against the two selected neighbor pixels in the current field. If the center value falls within the range of the other two, the center value is used. If the center falls outside the other two selected neighbor values, the average of the selected neighbor values is used as the final pixel value.

The selected neighbor pixels in the current field (top line and bottom line) are thus compared with the target value in the reference field. Motion adaptation is achieved through the use of spatial-temporal filter. Generally, natural scenes are smooth and most video capture devices have limited capture bandwidth. In near-stationary areas, the target value in the reference field is correlated with the selected neighbors in the current field and most likely falls in between the values of the selected neighbors. In this case, the target value in the reference field is likely the output of the spatial-temporal filter. In contrast, in motion areas, the target value in the reference field is not correlated. The middle value is moving and will likely fall outside of neighborhood pixels. The spatial-temporal filter in this case will likely output an average of the two selected neighboring pixels from the current field.

For example, for ST filter (X) 512, in near-stationary areas, value X in the reference field is correlated with the selected neighbors in the current field and most likely falls in between the values of the selected neighbors. In this case, X is likely the output of the spatial-temporal filter. In contrast, in motion areas, value X in the reference field is not correlated. The spatial-temporal filter in this case will likely output an average of the two selected neighboring pixels from the current field.

Equations for one embodiment of the edge adaptive spatial temporal deinterlacer for seven edge angles are described below. In particular, the reconstructed pixels in positions X and Y are given by $$X_{new} = \begin{cases} st(TL_x, BL_x, X) & \text{for a left edge} \\ st(TR_x, BR_x, X) & \text{for a right edge} \\ st(B, E, X) & \text{no edge found} \end{cases}$$

and $$Y_{new} = \begin{cases} st(TL_y, BL_y, Y) & \text{for a left edge} \\ st(TR_y, BR_y, Y) & \text{for a right edge} \\ st(C, F, Y) & \text{no edge found} \end{cases}$$

where TLx and BLx stand for the top and bottom pixel on the left edge for X, and TRy and BRy stand for the top and bottom pixel on the right edge for Y.

Considering the three left edge directions at −28 degree, −45 degree and −62 degree, the edge value is given by $$E_{-28} = |aa - fh| + |ab - hh|,$$

$$E_{-45} = |A - F| + |B - H|,$$

$$E_{-62} = |bc - fh| + |ab - ef|.$$

The dominating Left edge is determined from the three Left edge values based on the following equation $$E_{left} = \begin{cases} E_{-62} & \text{if } E_{-62} \leq E_{-45} \text{ and } E_{-62} \leq E_{-28} \\ E_{-45} & \text{else if } E_{-45} < E_{-62} \text{ and } E_{-45} \leq E_{-28} \\ E_{-28} & \text{otherwise (when } E_{-28} < E_{-62} \text{ and } E_{-28} < E_{-45}) \end{cases}$$

With it, the pixels along the dominating Left edge is given by $$(TL_x, BL_x, TL_y, BL_y) = \begin{cases} (bc, fh, ab, , ef) & \text{if } E_{left} = E_{-62} \\ (A, F, B, H) & \text{else if } E_{left} = E_{-45} \\ (aa, fh, ab, hh) & \text{otherwise } (E_{left} = E_{-28}) \end{cases}$$

The dominating Right edge is arrived in a similar manner. The vertical edge is given simply by $$E_{vertical} = |B - E| + |C - F|$$

The detected edge direction is governed by the following equations $$Edge = \begin{cases} \text{left} & \text{if } DA_{enable} \& (E_{left} < T_l) \& (E_{left} + T_h < E_{right}) \& (E_{left} + T_h < E_{vertical}) \\ \text{right} & \text{elseif } DA_{enable} \& (E_{right} < T_l) \& (E_{right} + T_h < E_{left}) \& (E_{right} + T_h < E_{vertical}) \\ \text{vertical} & \text{otherwise} \end{cases}$$

where Tl and Th are the low and high thresholds, and the edge values, Eleft, Evertical, Eright, are the edge directions.

Figure 7:
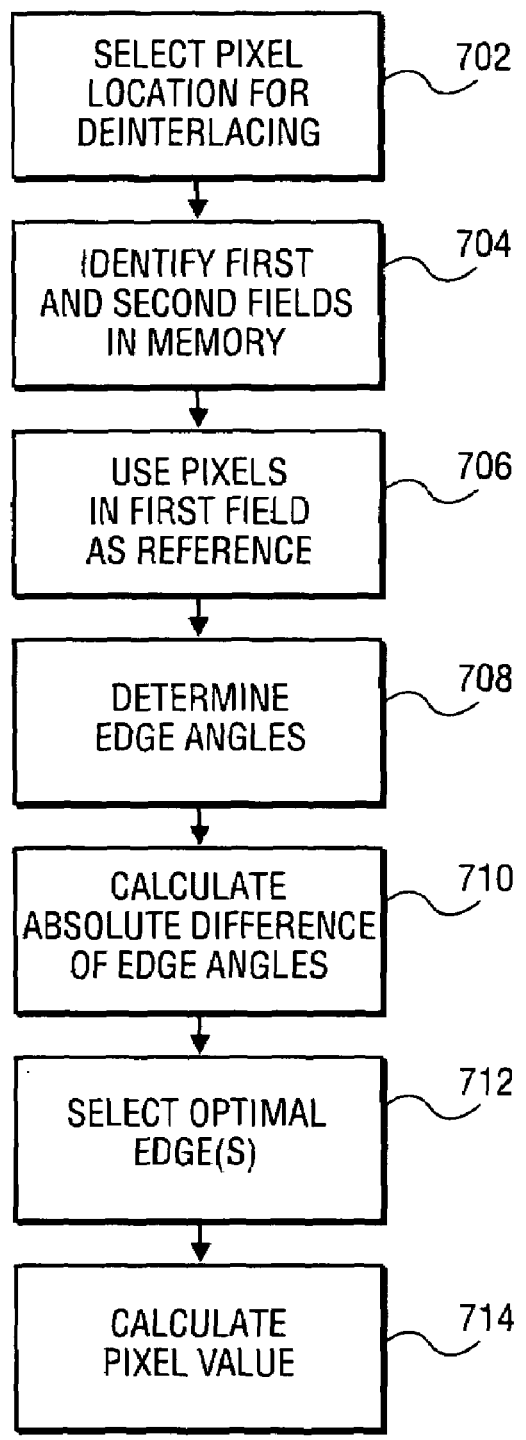
FIG. 7 is a process flow diagram of an embodiment for deinterlacing.

FIG. 7 shows a process flow diagram of an embodiment 600 of the present invention for deinterlacing.

In step 702, a pixel location in output frame is selected for deinterlacing. This is done iteratively to cover the entire frame.

In step 704, first and second input fields stored in memory are identified.

In step 706, pixels in the first field are used as references to construct a value for at least one targeted pixel location in the second field. Pixels in the first field above and below the target pixel in the second field are identified.

In step 708, edge angles are determined based upon the pixels in the first field. In particular, left, right and vertical edge angles are determined based upon the pixels in the first field. The edge angles intersect the targeted pixel location in the second field. Edge angles with subpixel precision are determined based upon the pixels in the first field using interpolation and extrapolation.

In step 710, the absolute difference of the pixels forming the edge angles is calculated.

In step 712, at least one optimal edge angle based upon the absolute difference calculations is selected.

In step 714, a pixel value is calculated for the selected pixel location in output frame.

The present invention may be implemented in software or firmware, as well as in programmable gate array devices, ASIC and other hardware.

The above description of illustrated embodiments of the invention is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method of deinterlacing video frames, comprising:
   identifying first and second input fields stored in memory; and
   using pixels in the first field as references to construct a value for at least one targeted pixel location in the second field comprising:
      identifying pixels in the first field;
      determining edge angles based upon the pixels in the first field;
      calculating the absolute difference of the pixels forming the edge angles;
      selecting at least one optimal edge angle based upon the absolute difference calculations; and
      constructing a value for at least one targeted pixel location in the second field based upon the at least one optimal edge angle selected.

2. The method claimed in claim 1 wherein identifying pixels in the first field further comprises:
   identifying pixels in the first fields located above and below the second field.

3. The method claimed in claim 1 wherein determining edge angles based upon the pixels in the first field further comprises:
   determining left, right and vertical edge angles based upon the pixels in the first field.

4. The method claimed in claim 3 wherein the edge angles intersect the targeted pixel location in the second field.

5. The method claimed in claim 1 wherein calculating the absolute difference of the pixels forming the edge angles further comprises:
   determining the absolute difference of the pixels in the first field above and below the target pixel in the second field for each edge angle.

6. The method claimed in claim 5, wherein determining the absolute difference of the pixels in the first field above and below the target pixel in the second field for each edge angle further comprises:
   sorting edge angles into left, right and vertical edge groups;
   determining the optimal angle within each group.

7. The method claimed in claim 5 wherein selecting at least one optimal edge angle based upon the absolute difference calculations further comprises:
   determining the optimal edge angle based upon the edge angle that has the smallest absolute difference calculation.

8. The method claimed in claim 7 wherein determining the optimal edge angle based upon the edge angle that has the smallest absolute difference calculation further comprises:
   determining the edge angle that has an absolute difference that is smaller than that of the other two edge angle directions by a first threshold.

9. The method claimed in claim 7 wherein determining the optimal edge angle based upon the edge angle that has the smallest absolute difference calculation further comprises:
   determining the edge angle that has an absolute difference that is smaller than a second threshold.

10. The method claimed in claim 5 wherein selecting at least one optimal edge angle based upon the absolute difference calculations further comprises:
    determining the optimal edge direction and associated angles based upon the smallest of absolute difference sums among the edge angle directions.

11. The method claimed in claim 10 wherein determining the optimal edge direction and associated edge angles based upon the smallest of absolute difference sums among the edge angle directions further comprises:

determining the edge angle direction and associated angles that have an absolute difference sum that is smaller than that of the other two edge angle directions by a first threshold.

12. The method claimed in claim 11 wherein determining the edge angle direction and associated angles that have an absolute difference sum that is smaller than that of the other two edge angle directions by a first threshold further comprises:
determining the edge angle direction and associated angles that have an absolute difference sum that is smaller than a second threshold.

13. The method claimed in claim 1 wherein identifying pixels in the first field further comprises:
interpolating between pixels in the first field to generate additional pixels.

14. The method claimed in claim 1 wherein identifying pixels in the first field further comprises:
extrapolating between pixels in the first field to generate additional pixels.

15. The method claimed in claim 1 wherein the first and second fields comprise odd and even lines in an interlaced video frame, wherein the lines of the two fields are displayed in an alternating fashion.

16. A system for deinterlacing a video signal, comprising:
a pixel selector to identify first and second input fields stored in memory, wherein the pixel selector identifies pixels in the first field;
an edge filter to determine edge angles based upon the pixels in the first field;
an edge detector to determine optimal edge angles from among the edge angles;
an absolute difference circuit to calculate the absolute difference of the pixels forming the edge angles, wherein the edge detector selects at least one optimal edge angle based upon the absolute difference calculations; and
a second filter to use pixels in the first field as references to construct a value for at least one targeted pixel location in the second field, wherein the second filter constructs a value for at least one targeted pixel location in the second field based upon the at least one optimal edge angle selected.

17. The system claimed in claim 16 wherein the pixel selector identifies pixels in the first fields located above and below the second field.

18. The system claimed in claim 16 wherein the edge detector determines left, right and vertical edge angles based upon the pixels in the first field.

19. The system claimed in claim 18 wherein the edge angles intersect the targeted pixel location in the second field.

20. The system claimed in claim 16 wherein the absolute difference circuit determines the absolute difference of the pixels in the first field above and below the target pixel in the second field for each edge angle.

21. The system claimed in claim 20 wherein the absolute difference circuit sorts edge angles into left, right and vertical edge groups and determines the optimal angle within each group.

22. The system claimed in claim 20 wherein the edge detector determines the optimal edge angle based upon the edge angle that has the smallest absolute difference calculation.

23. The system claimed in claim 22 wherein the edge detector determines the edge angle that has an absolute difference that is smaller than that of the other two edge angle directions by a first threshold.

24. The system claimed in claim 22 wherein the edge detector determines the edge angle that has an absolute difference that is smaller than a second threshold.

25. The system claimed in claim 20 wherein the edge detector determines the optimal edge direction and associated angles based upon the smallest of absolute difference sums among the edge angle directions.

26. The system claimed in claim 25 wherein the edge detector determines the edge angle direction and associated angles that have an absolute difference sum that is smaller than that of the other two edge angle directions by a first threshold.

27. The system claimed in claim 26 wherein the edge detector determines the edge angle direction and associated angles that have an absolute difference sum that is smaller than a second threshold.

28. The system claimed in claim 16 wherein the pixel selector interpolates between pixels in the first field to generate additional pixels.

29. The system claimed in claim 16 wherein the pixel selector extrapolates between pixels in the first field to generate additional pixels.

30. The system claimed in claim 16 wherein the first and second fields comprise odd and even lines in an interlaced video frame, wherein the lines of the two fields are displayed in an alternating fashion.

31. A machine readable medium having stored therein a plurality of machine readable instructions executable by a processor to deinterlace video frames, comprising:
instructions to identify first and second input fields stored in memory; and
instructions to use pixels in the first field as references to construct a value for at least one targeted pixel location in the second field comprising:
instructions to identify pixels in the first field;
instructions to determine edge angles based upon the pixels in the first field;
instructions to calculate the absolute difference of the pixels forming the edge angles;
instructions to select at least one optimal edge angle based upon the absolute difference calculations; and
instructions to construct a value for at least one targeted pixel location in the second field based upon the at least one optimal edge angle selected.

32. The machine readable medium claimed in claim 31 wherein instructions to identify pixels in the first field further comprises:
instructions to identify pixels in the first fields located above and below the second field.

33. The machine readable medium claimed in claim 31 wherein instructions to determine edge angles based upon the pixels in the first field further comprises:
instructions to determine left, right and vertical edge angles based upon the pixels in the first field.

34. The machine readable medium claimed in claim 33 wherein the edge angles intersect the targeted pixel location in the second field.

35. The machine readable medium claimed in claim 31 wherein instructions to calculate the absolute difference of the pixels forming the edge angles further comprises:
instructions to determine the absolute difference of the pixels in the first field above and below the target pixel in the second field for each edge angle.

36. The machine readable medium claimed in claim 35, wherein instructions to determining the absolute difference of the pixels in the first field above and below the target pixel in the second field for each edge angle further comprises:
instructions to sort edge angles into left, right and vertical edge groups; and
instructions to determine the optimal angle within each group.

37. The machine readable medium claimed in claim 35 wherein instructions to selecting at least one optimal edge angle based upon the absolute difference calculations further comprises:
instructions to determining the optimal edge angle based upon the edge angle that has the smallest absolute difference calculation.

38. The machine readable medium claimed in claim 37 wherein instructions to determine the optimal edge angle based upon the edge angle that has the smallest absolute difference calculation further comprises:
instructions to determine the edge angle that has an absolute difference that is smaller than that of the other two edge angle directions by a first threshold.

39. The machine readable medium claimed in claim 37 wherein instructions to determine the optimal edge angle based upon the edge angle that has the smallest absolute difference calculation further comprises:
instructions to determine the edge angle that has an absolute difference that is smaller than a second threshold.

40. The machine readable medium claimed in claim 35 wherein instructions to select at least one optimal edge angle based upon the absolute difference calculations further comprises:
instructions to determine the optimal edge direction and associated angles based upon the smallest of absolute difference sums among the edge angle directions.

41. The machine readable medium claimed in claim 40 wherein instructions to determine the optimal edge direction and associated edge angles based upon the smallest of absolute difference sums among the edge angle directions further comprises:
instructions to determine the edge angle direction and associated angles that have an absolute difference sum that is smaller than that of the other two edge angle directions by a first threshold.

42. The machine readable medium claimed in claim 41 wherein instructions to determine the edge angle direction and associated angles that have an absolute difference sum that is smaller than that of the other two edge angle directions by a first threshold further comprises:
instructions to determine the edge angle direction and associated angles that have an absolute difference sum that is smaller than a second threshold.

43. The machine readable medium claimed in claim 31 wherein instructions to identify pixels in the first field further comprises:
instructions to interpolate between pixels in the first field to generate additional pixels.

44. The machine readable medium claimed in claim 31 wherein instructions to identify pixels in the first field further comprises:
instructions to extrapolate between pixels in the first field to generate additional pixels.

45. The machine readable medium claimed in claim 31 wherein the first and second fields comprise odd and even lines in an interlaced video frame, wherein the lines of the two fields are displayed in an alternating fashion.

46. A signal deinterlacer, comprising:
a pixel selector to identify first and second input fields stored in memory, wherein the pixel selector identifies pixels in the first field; and
an edge filter to receive the pixels in the first field as references to construct a value for at least one targeted pixel location in the second field, wherein a second filter constructs a value for at least one targeted pixel location in the second field based upon the at least one optimal edge angle selected.

47. The deinterlacer claimed in claim 46 wherein the pixel selector identifies pixels in the first fields located above and below the second field.

48. The deinterlacer claimed in claim 46 wherein an edge detector determines left, right and vertical edge angles based upon the pixels in the first field and the edge angles intersect the targeted pixel location in the second field.

49. The deinterlacer claimed in claim 46 further comprising:
a circuit to determine the absolute difference of the pixels in the first field above and below the target pixel in the second field for each edge angle.

50. The deinterlacer claimed in claim 49 wherein the absolute difference circuit sorts edge angles into left, right and vertical edge groups and determines the optimal angle within each group.

51. The deinterlacer claimed in claim 49 wherein an edge detector determines the optimal edge angle based upon the edge angle that has the smallest absolute difference calculation.

52. The deinterlacer claimed in claim 51 wherein the edge detector determines the edge angle that has an absolute difference that is smaller than that of the other two edge angle directions by a first threshold.

53. The deinterlacer claimed in claim 51 wherein the edge detector determines the edge angle that has an absolute difference that is smaller than a second threshold.

54. The deinterlacer claimed in claim 49 wherein an edge detector determines the optimal edge direction and associated angles based upon the smallest of absolute difference sums among the edge angle directions.

55. The deinterlacer claimed in claim 54 wherein the edge detector determines the edge angle direction and associated angles that have an absolute difference sum that is smaller than that of the other two edge angle directions by a first threshold.

56. The deinterlacer claimed in claim 55 wherein the edge detector determines the edge angle direction and associated angles that have an absolute difference sum that is smaller than a second threshold.

57. The deinterlacer claimed in claim 46 wherein the pixel selector interpolates between pixels in the first field to generate additional pixels.

58. The deinterlacer claimed in claim 46 wherein the pixel selector extrapolates between pixels in the first field to generate additional pixels.

59. The deinterlacer claimed in claim 46 wherein the first and second fields comprise odd and even lines in an interlaced video frame, wherein the lines of the two fields are displayed in an alternating fashion.

* * * * *